United States Patent [19]

Hou et al.

[11] 4,278,551

[45] Jul. 14, 1981

[54] WOUND CARTRIDGE FILTERS

[75] Inventors: Kenneth C. Hou, Glastonbury; Michael F. Kilty, Windsor Locks, both of Conn.

[73] Assignee: AMF Incorporated, White Plains, N.Y.

[21] Appl. No.: 62,219

[22] Filed: Jul. 30, 1979

[51] Int. Cl.³ .............................................. B01D 27/00
[52] U.S. Cl. ................................ 210/767; 210/497.01; 210/508
[58] Field of Search ........... 55/524; 210/494 R, 497.1, 210/504–508, 767, 777, 323.2, 483, 497.01; 252/313 S

[56] References Cited

U.S. PATENT DOCUMENTS

| | | | |
|---|---|---|---|
| 3,065,856 | 11/1962 | Goldman | 210/494 R |
| 3,745,126 | 7/1973 | Moore, Jr. | 252/313 S |
| 3,816,304 | 6/1974 | Wallis et al. | 210/504 X |
| 4,007,114 | 2/1977 | Ostreicher | 210/505 |

Primary Examiner—Ivars C. Cintins
Attorney, Agent, or Firm—George W. Price; Michael E. Zall

[57] ABSTRACT

Porous wound cartridge filters comprising a tubular element defined by superposed windings of a continuous yarn bundle, the surfaces of which are modified with cationic colloidal silica.

10 Claims, No Drawings

WOUND CARTRIDGE FILTERS

This application relates to wound cartridge filters and more particularly to such filters of enhanced performance and desirable aesthetics.

Cartridge filters in the resinated and wound form are well known, and are widely used in industry as they are characterized by relatively high flow and long life even at relatively high contamination levels.

Ecological and health-related concerns have increased interest in the control or monitoring of low concentrations of small particle materials in water supplies, especially for human consumption. In this context, even colloidal hazes of extremely small dimension are accordingly deemed undesirable even if not directly harmful. The sensitivity to contaminant population extends to concern respecting the purity of cleanliness and integrity of any filtration system employed. Thus, a filtration system is qualified not only for efficiency in the small particle contaminant region, but also for integrity of the filter structure and appearance.

Cartridge filters in the resinated form are well suited for residential use, as being of suitable integrity and having high flow and long life but are subject to extraction of organic residues and/or are unacceptable aesthetically, by reason of the dark colored bonding agents in common use. Other bonding agents have been found to provide insufficient integrity to the structure, another necessary requirement, without reducing extractables.

Wound cartridge filters on the other hand are supported without bonding agents and accordingly offer a normally white, clean and pleasing appearance. Unfortunately, these structures are of relatively large pore dimension.

In mechanical straining a particle is removed by physical entrapment when it attempts to pass through a pore smaller than itself. It is therefore necessary in such cases that the pore size of the filter medium be smaller than the particle size of the contaminant to be removed from the fluid. Thus, for removal of fine, submicronic contaminant particles by mechanical straining, the filter media need have correspondingly fine pores. Since the pore size of such a structure is determined predominantly by the size and morphology of the materials employed in its construction, in this filter sheet media component materials of small size, such as small diameter fibers may be employed for enhancement of fine filtration (See Pall, U.S. Pat. Nos. 3,158,532; 3,238,056; 3,246,767; 3,353,682 or 3,573,158).

Within the geometric constraints of wound filter cartridge construction, some alteration in mechanical straining characteristics to enhance capture efficiency is possible, as by selection of yarn type, reducing yarn denier or increasing surface area through fibrillation of the yarn surface. However, these are small order effects making only minor adjustments in efficiency possible.

Use of a charge modifying resin to modify surface charge and enhance small particle capture utilizing electrokinetic effects is also known in thin filter media sheet; and charge modification of resinated cartridge filters may be achieved, with the selective combination of a melamine-formaldehyde resin bonding agent and a polyamido/polyamine-epichlorhydrin charge modifier, as disclosed in copending and commonly assigned application Ser. No. 46743 of Kilty and Pernigotti.

These selected charge modifiers do not exhibit significant discoloration upon drying and curing in thin sheet, but upon incorporation in thick walled cartridge filters require high temperatures of about 300° and long drying times up to three hours or more, and under such conditions the cellulose or the resin itself is discolored or degraded to an unacceptable degree.

If reduced temperatures are employed, insufficient interreaction with the filter element develops, and the charge modifying resin will not be retained.

Accordingly, it is an object to provide a cartridge filter construction characterized by high integrity, low extractables, long life and high flow with efficiency for small particle contaminants and improved aesthetics.

BRIEF DESCRIPTION OF THE INVENTION

It has now been found that wound filter cartridges can be provided with improved filtration efficiency for small particle contaminants without suffering aesthetically, through the introduction to the structure of a cationic silica colloid as a charge modifier. The resulting cartridge is characterized by high integrity, long life, high flow and enhanced efficiency for small particle contaminants while preserving its pleasing appearance.

The silica colloid charge modifier is characterized by reduced thermal cure demands permitting efficient drying and curing under conditions where thermal degradation or other discoloration effects are minimized, and attendant energy conservation realized.

The wound non-resinated cartridges are commonly formed from yarn which may be surface napped to afford additional surface area. The yarn is typically wholly cellulose, e.g., cotton or rayon but in some cases may be constituted of synthetics such as cellulose acetate, nylon, glass, polypropylene or an acrylic. In referring to yarn, it will be understood that the term comprehends any fiber structure or strand of extended length and small diameter whether formed from continuous or discontinuous fibrous elements, interengaged into a coherent generally funicular form for winding. Fibrillated yarn or film tapes, or slit tows for example may be used where desired although a cotton roving of e.g., 0.50 to 0.60 cotton count is more typically employed.

The yarn is wound about a pervious support, usually a foraminous plastic or metal core or tube, utilizing conventional winding techniques to establish the desired pore structure in and between the superposed layers of windings. Commonly, the yarn is traversed in a spiral, criss-cross pattern providing a pattern of overlapping yarn segments forming upon development of the wind large diamond shaped chambers. Suitable such structures may be prepared in accordance with any of the disclosures of U.S. Pat. Nos. 3,319,793; 3,556,226 and 3,398,905 incorporated herein by reference. The windings are selected to control the density and pore size, a nominal 1 micron filter being wound with 39 diamonds spread circumferentially around an approximately 1 inch diameter center core and a nominal 20 micron fiber using 15 diamonds, etc., with fewer diamonds correlating with coarser filtration.

In an alternative and often preferred embodiment, the yarn is wound in such a manner as to entrap and retain fibrous media such as a non-woven batt, e.g., carded sliver. This type of structure may be formed as described in U.S. Pat. No. 3,065,856 or 3,648,846, also incorporated herein by reference. In these constructions, the diamond chambers are provided with one or more walls constituted of the fibrous media, to afford a positive barrier to micronic sized particles. The media sheet may of course comprise additional components, for example particulate filter aid where desired.

Charge modification of the filter surfaces may be readily accomplished by immersion and adsorption of the charge modifier, removal of excess resin as by suck-out and subsequent drying and curing. The treatment may of course be achieved by charge modifying one or more of the filter elements, e.g., the non-woven batt separately during construction but in general a resin solution of e.g., 5% solids is used and the preformed cartridge treated to provide from about 3 to about 4% (by weight, solids) silica colloid. Where the choice of treatment provides additional unmodified surface area in the system, the fiber surfaces may be additionally treated with a source of poly basic aluminum cations, e.g., aluminum chlorhydrate to increase the level of charge modification.

DETAILED DESCRIPTION OF THE INVENTION

The cationic colloidal silica is an aqueous dispersion of positively charged colloidal particles consisting of a dense silica core coated with a positively charged polyvalent metal-oxygen compound typically stabilized with a counterion.

Suitable cationic colloidal silica materials include those of U.S. Pat. Nos. 3,007,878, 3,252,917, 3,620,978, 3,719,607 and 3,956,171 all incorporated by reference. These are aqueous dispersions of positively charged colloidal particles consisting of a dense silica core coated with a positively charged polyvalent metal-oxygen compound, e.g., of the class consisting of metal oxides, metal hydroxides and hydrated metal oxides of metals having a valence of 3 or 4, preferably aluminum and titanium. Most preferably, the dispersion is acidic, and the coating is of polymeric alumina species. Typically, the mole ratio of aluminum to silica on the surface is about 1:1, and the dispersion (which has been commercially available as Ludox Positive Sol 130M, from E. I. duPont de Nemours & Co.) is stabilized with a counterion, as described in the aforesaid U.S. Pat. No. 3,007,878. The dispersion has been supplied at 30% solids, stabilized with chloride ion (1.4%, as NaCl) for use in the pH range 3.5 to 5.5.

The colloidal particles exhibit a surface area of about 150–225 $m^2/g$ by nitrogen adsorption, a particle diameter of about 15–16 mu, and a molecular weight of about 5 to 18 million by light scattering.

In its preferred form, the characteristics of the silica aquasol are further modified to higher levels of polymeric alumina species calculated as alumina from 13 to 15% or more, in the stable range based upon the colloidal solids. The coating, or overcoating, may be achieved by simply treating with an appropriate aluminum compound, e.g., basic aluminum chloride, as described in U.S. Pat. No. 3,007,878, or another source of polybasic aluminum cations. The alumina in such systems exists as a surface coating and, to the extent it exceeds the available surface area, as free alumina in solution. The free alumina may, of course, also serve as a coating for virgin surfaces in the filter. Where desired, the resulting colloidal dispersion may be, and customarily is treated to remove excessive electrolyte, as by dialysis, in order to achieve storage stability. The coating with an aluminum compound may of course be effected separately from the treatment with the silica colloid, or these materials may be combined as aforesaid.

The cationic resin is provided to modify the surface charge of at least one of the filter elements, i.e., the yarn or batt to render the surface less electronegative and optionally and preferably, sufficient charge modifier is deposited to provide at least certain electropositive regions or sites within the cartridge structure. It is believed that these regions or sites are responsible for the enhanced filtration efficiency achieved, although it is surprising to find electrokinetic effects controlling given the relatively large pore structure involved.

The amount of charge modifier employed in the present invention is thus that sufficient to enhance the filtration efficiency of the unmodified cartridge. Increased amounts of charge modifier may be employed where desired to provide some bonding strength, but ordinarily 3–4 percent by weight of the silica colloid will prove sufficient.

The silica colloid is commonly applied by dipping the preformed cartridge into a dispersion of e.g., 5% solids and by mere impregnation or with vacuum assist incorporating about 100–125% by weight wet pickup of the dispersion. Other methods of application such as spray application during cartridge formation, or pretreatment of the filter elements or combinations thereof are of course contemplated. Following application of the silica colloid, the cartridge is dried and cured.

It is a feature of the present invention that the thermal requirements in the typical drying and curing stage are minimized. Thus, in a commercial operation involving the handling of 400 or more cartridges, the drying will be accomplished at less than 300° F., usually 225°–275° F., for a period of one to three hours to attain bone dryness.

While the drying and curing stage may be conducted in any suitable manner, in some cases it is desirable to employ techniques of static (oven) drying, to insure a uniform or relatively homogeneous effective distribution of cationically modified sites. Impregnated cartridge filters are typically dried utilizing sparged heated air supplied from within the central aperture, or convection drying along the exterior profile. The use of this now conventional technique on the filters of the invention results, however, in cartridges having a relatively restricted and ineffective charge modified surface, in that it is found that the modifying resin tends to migrate and accumulate toward the source of drying heat, or the interior or exterior surface of the cartridges. Thus to provide a relatively homogeneous distribution of charge modified sites, it is desirable to employ static drying under the aforementioned temperature constraints. The invention of course contemplates a profiled distribution of charge modifier where desired.

The yarn employed in the cartridge design is most commonly cotton e.g., of 2.7 tpi having a Micronaire rating of 2.8 to 5.1, although any fiber fineness or yarn weight within reason is acceptably used.

The cartridge itself is formed in conventional manner as aforesaid by winding yarn on a mandrel about a pervious support to form an at least semi-rigid core.

The rate of yarn feed which may be constant, or variable with yarn build is in part determined by the winding pattern, in turn dictated by the desired density and pore dimension in the cartridge. Typical winding patterns provide a series of diamond configurations ranging from 20 to 40 along the 9–10 inch length of the cartridge, and 7 to 12 around the about 2½ inch circumference. The yarn build therefore provides a bed structure composed of three dimensional diamond shaped chambers, about 1½ inches in thicknes about the hollow core.

The designation of the filter elements and the winding conditions determine the geometric characteristics of the structure and establishes in the interstices between the filter elements the permanent pore dimensions and hence the flow rate of the structure. Typically such structures exhibit water flow rates of 1 to 20 gallons per minute (gpm) at 2 psid.

The cartridge is employed in a housing of conventional design. The inlet flow from the top of the housing is distributed along the exterior of the normally vertically disposed cartridge and filtration is effected by axial flow under pump pressure from the exterior to the interior, thence to outlet flow through the bottom of the housing.

In the preferred embodiment, the wound cartridge is prepared with inserted filter media sheet, as disclosed in U.S. Pat. Nos. 3,065,856 or 3,648,846. These structures are of lower density, higher flow rate and longer life than the standard wound cartridges but offer a more open pore structure, hence the effect of the charge modifier in effecting improvement in filtration efficiency is more pronounced. In this embodiment a sheet or web of filter media such as carded cotton is fed to the winder and is engaged in place in a spiral configuration by the end(s) of winding yarn traversing the width of the sheet or web (along the longitudinal axis of the finished cartridge) and wrapping in a criss-cross pattern into an integral structure. Most preferably, the sheet, web or batt is fed to the winder at a fixed rate and yarn and winder speed are held constant such that drawing tension responsive to the radius of the yarn build provides a density gradient across the section. It will of course be understood that controlled, variable or programmed density gradients may be similarly provided responsive to or by interrelationship of rate of web or yarn feed or winder speed relative to radius of the yarn build.

The inserted filter media may be constituted of any otherwise suitable material having sufficient surface area for filtration but for economy usually comprises cotton, rayon or mixed waste in the form of a carded batt of staple fiber. It will be understood that the batt may incorporate particulate filter aids, carbon, glass fiber or other agents to enhance surface area or increase mechanical straining efficiency as desired.

The preferred inserted filter media is carded cotton (e.g., in the form of a 9¾ inch wide web, having a weight of 570-630 grains per linear yard). The weight of the web, or the amount incorporated can of course be varied, as to supply as little as 3 grams up to 85 grams or more of inserted media. As the surface area of the cartridge is only somewhat greater, it will be understood that most of the surface area is provided by the inserted media, whereas the geometry of the yarn build, or winding pattern essentially determines pore dimension.

PERFORMANCE TESTING

1. Filtration Efficiency

In this test, contaminated fluid of a specified turbidity (normally 30-35 FTU for coarse contaminant and 70-75 FTU for fine contaminant is pumped through the cartridge at a specified flow rate (usually 1-3 gpm), effluent turbidity measured (using a Hach model 2100A Turbidimeter) generally over the first 5-6 minutes of filtration, and expressed as percent filtration (turbidimetric) efficiency when compared to the inlet turbidity, calculated as $$\text{Efficiency} = \frac{\text{Turbidity In} - \text{Turbidity Out}}{\text{Turbidity In}}$$

Usually, the inlet and outlet turbidity values are averaged; and on occasion the final turbidity (effluent) value is employed, (at the point when the differential pressure across the cartridge exceeds 20 psid, the conclusion of the test). The performance of the filter may also be seen by examination of the change in effluent turbidity values with time, and the elapsed time to conclusion of the test at 20 psid. The contaminant is natural Arizona road dust (supplied by AC Spark Plug Division of General Motors Corp.) having a relatively wide spectrum of particles, classified (by the G.M. Phoenix Laboratory) as follows:

|                  | Coarse    | Fine      |
|------------------|-----------|-----------|
| 0 to 5 microns   | 12 ± 2%   | 39 ± 2%   |
| 5 to 10 microns  | 12 ± 3%   | 18 ± 3%   |
| 10 to 20 microns | 14 ± 3%   | 16 ± 3%   |
| 20 to 40 microns | 23 ± 3%   | 18 ± 3%   |
| 40 to 80 microns | 30 ± 3%   | 9 ± 3%    |
| 80 to 200 microns| 9 ± 3%    | —         |

2. Contaminant Capacity (Gram-Life)

In the same manner, the performance of the filter may be expressed as the grams of contaminant retained by the filter upon the conclusion of the test at 20 psid.

Other characteristics, e.g., of chemical, water and solvent resistance are commonly tested and reported but are conventional for these structures and in industry usage.

EXAMPLE I

In the following series of runs, turbidimetric efficiency (inlet turbidity 70-72 FTU, AC Fine contaminant, 1 gpm flow rate) and contaminant capacity were determined comparatively for conventional commercial wound cartridge filters untreated, and treated with silica colloid (Wesol PA, a cationic colloidal silica charge modifier available from Wesolite Corp., Wilmington, Delaware (4.0% alumina, 22.5% silica, 30% solids)) or mixtures of Wesol PA and Wesol Plus (a source of polybasic aluminum cations from the same manufacturer). All treated cartridges were dried and cured at 300° F. for 2-3 hours, depending upon fiber weight. The results are set forth in Table I as follows:

TABLE I

| Cartridge | Treatment | Turbidimetric Efficiency (%) | Contaminant Capacity (Grams) |
|---|---|---|---|
| A. wound, napped type | | | |
| 1 Commercial rayon, (10 × 39 wind) | None | 73.0 | 18.3 |

TABLE I-continued

| Cartridge | Treatment | Turbidimetric Efficiency (%) | Contaminant Capacity (Grams) |
|---|---|---|---|
| 2 Commercial rayon, (10 × 39 wind) | 5% (80/20 mix of Wesol PA&Plus) | 98.4 | 15.9 |
| 3 Commercial cotton, (10 × 39 wind) | None | 86.3 | 28.2 |
| 4 Commercial cotton, (10 × 39 wind) | 5% (80/20 mix of Wesol PA&Plus) | 92.5 | 32.4 |
| 5 Polypropylene | None | 69.7 | — |
| 6 Polypropylene | 5% (80/30 mix of Wesol PA&Plus) | 85.8 | — |
| B. Inserted media type | | | |
| 7 Cotton/cotton (8 × 22.5 wind) | None | 78.0 | — |
| 8 Cotton/cotton (8 × 22.5 wind) | 5% Wesol PA | 97.5 | 63.1 |
| 9 Cotton/cotton (8 × 22.5 wind) | 5% Wesol Plus | 87.8 | 32.6 |
| 10 Cotton/cotton (8 × 22.5 wind) | 5% (80/20 mix Wesol PA&Plus) | 96.6 | 44.8 |

The Example demonstrates the improvement achievable with charge modification, even without geometric rearrangements. The cartridges retained a clean, fresh, white appearance throughout the testing. Run #9 demonstrates the effect of treating the filter directly with a soure of polybasic aluminum cations. Although an improvement was achieved, it compared unfavorably with the use of the silica colloid.

EXAMPLE II

Separate wound cartridge filters (AMF Cuno DCCSY: cotton yarn in 8×22.5 wind, inserted cotton media, 85 grams, flow rate about 1.5 gpm at 2 psid) were treated with 2% of a polyamido/polyamine-epichlorohydrin charge modifier (Hercules 1884), and 2% of a silica colloid modifier, and both dried and cured at 325° F. for 3 hours.

The silica colloid treated cartridge was white and bright and gave a pleasing appearance, whereas the cartridge treated with the 1884 resin was discolored, giving a dirty brown appearance.

EXAMPLE III

In a further series, wound cartridge filters (AMF Cuno D-CCSY) were treated with varying levels of charge modifier, dried and cured at different temperature levels, and tested for filtration performance (AC Fine contaminant, 70-72 inlet turbidity, flow rate 1 gpm).

The charge modifier employed in these runs was a cationic colloidal silica (3% solids) containing about 15% alumina based upon the weight of colloidal solids (determined by atomic absorption at 309 nanometer with a hollow cathode lamp and nitrous oxide-acetylene flame) having a surface area of about 220 m²/g (nitrogen adsorption) a particle diameter of about 15-16 mu and a molecular weight of about 5-18 million (light scattering).

The results are set forth in Table II as follows:

TABLE II

| Silica Colloid, Treatment (Wgt. %) | Dry Temperature (°F.) | Init. ΔP | Turb. Eff., % | Gram Life, gm. |
|---|---|---|---|---|
| 2% | 275 | 1.5 | 95.3 | 47.0 |
| | | 1.1 | 95.7 | 51.0 |
| 3% | 275 | 1.5 | 99.5 | 55.0 |
| | | 1.1 | 98.6 | 55.0 |
| 4% | 275 | 1.2 | 99.3 | 46.2 |
| | | 1.2 | 99.2 | — |
| 5% | 275 | 1.3 | 99.7 | 45.5 |
| | | 1.4 | 97.4 | — |
| 5% | 225 | 1.4 | 99.4 | 56.5 |

We claim:

1. A porous wound cartridge filter comprising a tubular element defined by superposed windings of a continuous yarn bundle, the surfaces of which are modified with cationic colloidal silica.

2. The filter of claim 1 wherein said element also incorporates inserted continuous fibrous sheet media interengaged into a coherent structure with said yarn bundle.

3. The filter of claim 2, wherein the surfaces of said fibrous sheet media are modified with cationic colloidal silica.

4. The filter of claim 1, comprising sufficient cationic colloidal silica to provide a positive zeta potential to at least some regions in said filter.

5. The filter of claim 4, comprising from about 2 to about 5 percent by weight of said cationic colloidal silica.

6. The filter of claim 1, wherein said cationic colloidal silica is derived from a dispersion of positively charged colloidal particles having a dense silica core modified with a polyvalent metal-oxygen compound.

7. The filter of claim 6, wherein said polyvalent metal is aluminum, and sufficient of said compound is provided to coat the silica to a level of at least 13% by weight of colloid solids.

8. A porous wound cartridge filter comprising a tubular element defined by superposed windings of a continuous yarn bundle interengaged into a coherent structure with windings of inserted continuous fibrous sheet media, the surfaces of at least one of said yarn and said fibrous sheet media being modified with a cationic colloidal silica.

9. A method for the treatment of wound cartridge filters comprising impregnating a dry preformed wound cartridge filter with a cationic silica colloid to provide a surface coating on the fibrous surfaces thereof sufficient to enhance filtration efficiency, and drying and curing the impregnated structure at a temperature below 300° F.

10. A method for the filtration of liquid at high flow rates and improved efficiency comprising passing said liquids through a porous wound cartridge filter comprising a tubular element defined by superposed windings of a continuous yarn bundle, the surfaces of which are modified with cationic colloidal silica.

* * * * *